Figure 1:
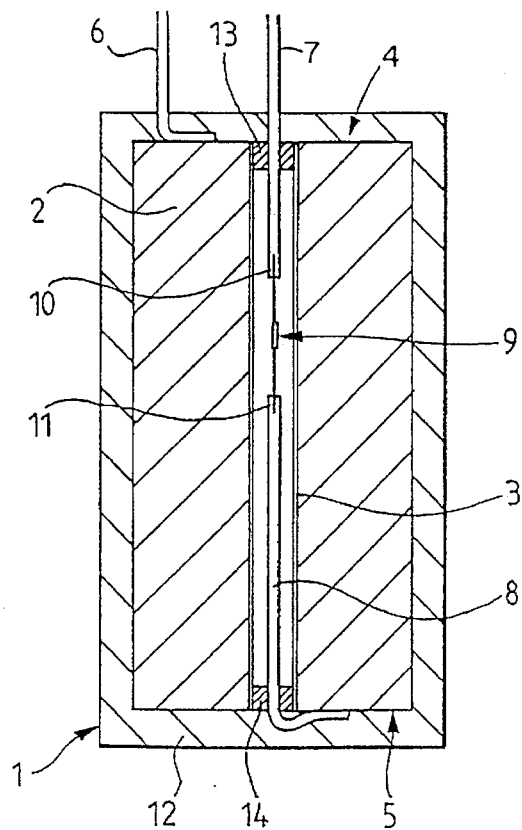

United States Patent [19]
Oravala

[11] Patent Number: 5,638,250
[45] Date of Patent: Jun. 10, 1997

[54] CAPACITOR PROVIDED WITH INTERNAL PROTECTION

[75] Inventor: Hans Oravala, Tampere, Finland

[73] Assignee: Nokia Kondensaattorit Oy, Finland

[21] Appl. No.: 481,504

[22] PCT Filed: Dec. 9, 1993

[86] PCT No.: PCT/FI93/00529
§ 371 Date: Sep. 18, 1995
§ 102(e) Date: Sep. 18, 1995

[87] PCT Pub. No.: WO94/15347
PCT Pub. Date: Jul. 7, 1994

[30] Foreign Application Priority Data
Dec. 29, 1992 [FI] Finland ................................ 925919

[51] Int. Cl.[6] ...................................................... H01G 2/16
[52] U.S. Cl. ............................ 361/275.4; 361/274.1; 361/534
[58] Field of Search .............................. 361/272–273, 361/274.1, 275.2, 275.4, 534

[56] References Cited

U.S. PATENT DOCUMENTS

| | | |
|---|---|---|
| 3,573,565 | 4/1971 | Grunert . |
| 3,579,061 | 5/1971 | Waldon . |
| 3,619,742 | 11/1971 | Rud, Jr. . |
| 4,635,163 | 1/1987 | Voglaire .................... 361/275 |
| 4,748,536 | 5/1988 | Robinson .................... 361/272 |
| 4,791,529 | 12/1988 | Duncan et al. ............... 361/274 |

*Primary Examiner*—Bot L. Ledynh
*Attorney, Agent, or Firm*—Finnegan, Henderson, Farabow, Garrett & Dunner, L.L.P.

[57] ABSTRACT

A capacitor which is provided with internal protection and in which plastic film is wound around a core tube (3) to form a capacitor cylinder (2). Metallic contact surfaces (4, 5) are formed at the ends of the cylinder to connect connecting leads, and a fusible portion (9) is provided between the second contact surface (5) and the phase lead, said fusible portion (9) serving both as a thermal fuse and as an overload protector.

8 Claims, 2 Drawing Sheets

CAPACITOR PROVIDED WITH INTERNAL PROTECTION

The invention relates to a capacitor provided with internal protection and made of a metallized plastic film, said capacitor comprising at least two metallized plastic films wound around a core tube to form a capacitor cylinder, a first and a second metallized contact surface formed at the ends of the capacitor cylinder, a first lead connected to said first contact surface, and a second lead which is conducted through the core tube of the capacitor cylinder and is in connection with the second contact surface of the capacitor cylinder, whereby the second lead is connected to the second contact surface by a separate conductor, and a thermal fuse is provided between the lead and the conductor.

Capacitors are manufactured by winding metallized plastic films into cylindrical coils, and spraying contact and fixing surfaces of zinc or some other suitable material to the ends of the cylinders so as to form two or more overlapping spiral capacitor surfaces, some of them being secured to the contact surface of one end of the cylinder and others being secured to the contact surface of the opposite end. In the event that a fault occurs in a capacitor, it is sometimes necessary to isolate it from the network or remove it from operation. Damage done to a capacitor is usually repaired by means of self-repair.

A self-repairing capacitor is based on the idea that a current peak penetrating the plastic film serving as an insulator evaporates the metallic film around the breakdown point so that the insulating strength becomes sufficiently high. If, however, the breakdown continues or the number of breakdowns increases, the plastic begins to warm up gradually, and the electric breakdown starts to heat the capacitor, whereby the temperature begins to rise, which exerts pressure on the capacitor. Consequently the electrical strength of the insulating plastic reduces, and the destruction accelerates as it is in a way self-progressive. This means that the higher the temperature gets, the lower is the voltage required to effect breakdown. Finally, when the temperature has become high enough, the insulating plastic begins to melt. If the destruction continues, the capacitor may catch fire, which may result in the entire capacitor being destroyed unless it is isolated.

The object of the present invention is to provide a capacitor with protection both against heating up and, if necessary, against other damages so that the capacitor can be isolated from a power source before it catches fire.

The capacitor of the invention is characterized in that said thermal fuse consists of a joint in which an electrical connection is formed between the lead and the conductor by means of a connecting material the melting point of which is lower than that of the plastic film of the capacitor cylinder.

An essential feature of the invention is that the second lead, extending to the middle of the capacitor, is connected to the conductor extending to one end of the capacitor by means of a connecting material, such as a solder or a soldering paste, having a melting point lower than that of the plastic used as insulating material in the capacitor. Another feature of the invention is that the melting point of the core tube in the capacitor is lower than that of the insulating plastic of the capacitor but higher than that of the soldering paste or solder. Still another feature of the invention is that the core tube is preferably air- or gas-filled so that the molten plastic mass may penetrate it and come in direct contact with the joint which is designed to be melted. The solder or paste is allowed to melt and escape from the joint between the lead and the conductor, whereby the lead and the conductor are disconnected from each other. The preferred embodiment of the invention is characterized in that the conductor extending from one end of the capacitor into the core tube is a rigid uninsulated copper or aluminium conductor with good conductivity of heat and electricity, and that a separate fuse wire is connected between the rigid copper conductor and the second connecting lead of the capacitor, said fuse wire acting as an overload protector and being tightly connected at least at one point by said solder or paste.

The advantage of the invention is that a single structure can be provided both with an overload protector by using a fuse wire, and a thermal protector by using a suitable amount of meltable connecting material. In addition, the same structure can also be provided with a fuse operating under the effect of pressure by connecting the lead extending into the core tube of the capacitor to the core tube more loosely than the rest of the structure; the pressure formed causes thus the core lead, i.e. the second lead, to be released more easily and thereby the fuse to be broken without the entire capacitor being broken under the effect of pressure. The solution is simple and easy to realize, and it operates in a reliable and secure manner.

Figure 2A:
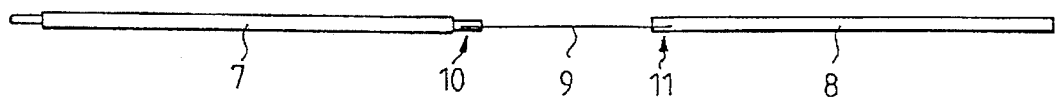
Figure 2B:
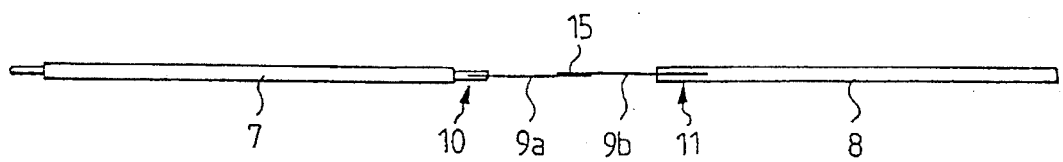
Figure 2C:
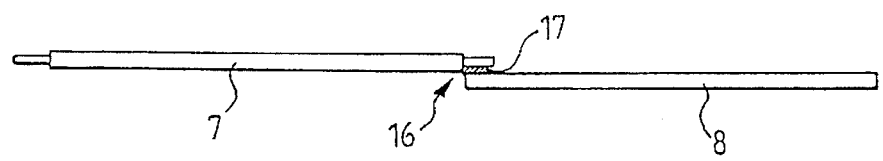
Figure 3A:
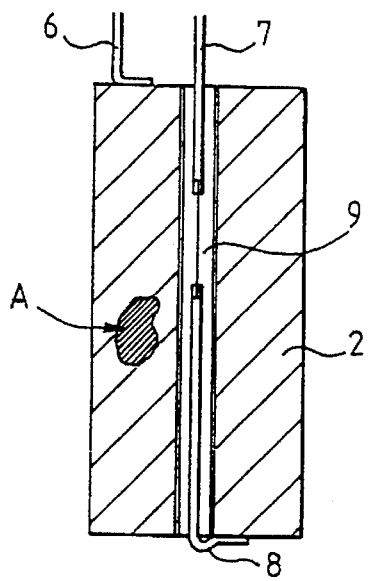
Figure 3B:
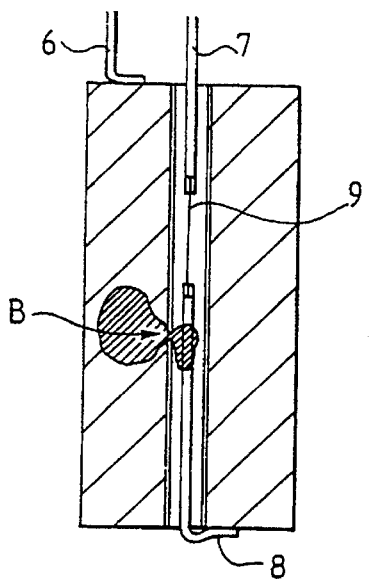
Figure 3C:
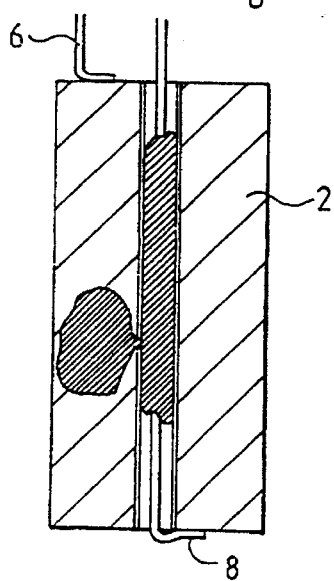

In the following, the invention will be described in greater detail with reference to the accompanying drawings, in which FIG. 1 is a schematic view of the cross-section of an embodiment of the capacitor according to the invention, FIGS. 2a to 2c show different embodiments of the fuse structure of the capacitor according to the invention, and FIGS. 3a to 3c illustrate schematically the operation of the capacitor according to the invention in a situation where a fault occurs.

FIG. 1 illustrates a capacitor comprising a case 1 within which the actual wound capacitor cylinder 2 is positioned. The capacitor cylinder 2 comprises a core tube 3 in the middle of it, and both of its ends are provided with contact surfaces 4 and 5. A first lead 6 is attached to the contact surface 4 on the upper surface of the capacitor 2, and a second lead 7 is conducted into the core tube 3. A rigid uninsulated conductor 8 extends from the contact surface 5 at the lower end of the capacitor inside the core tube 3. A fusible portion is arranged between the second lead 7 and the conductor 8, said fusible portion being attached at one end to the lead 7 by means of a joint 10 and at the other end to the conductor 8 by means of a second joint 11. A resin 12 is provided between the case 1 and the capacitor cylinder 2 and also on the upper surface of the capacitor to cover and protect the capacitor cylinder against humidity and the action of air. The resin 12 is, however, prevented from entering the core tube 3, for instance by means of gaskets 13 and 14; the lead 7 and the conductor 8 are thus surrounded by air or some other gas, or possibly by a suitable liquid, such as oil, which allows the invention to work. According to the invention, a thermal fuse is provided in the joint 10 or 11, or in a separate joint 15 which is formed in the middle of the fusible portion 9 and illustrated more closely in FIG. 2b. The thermal fuse is formed in such a manner that at least one of the joints 10, 11 and 15 consists of a connecting material, such as a solder or a soldering paste, the melting point of which is substantially lower than that of the insulating plastic, e.g. polypropylene, used in the capacitor. When the capacitor begins to be damaged because of breakdowns, the temperature therein rises, and when the temperature has become sufficiently high, the solder or paste melts with the result that the second lead 7 is isolated from the conductor 8, and the voltage between the metal films of the capacitor disappears. The operation of this solution will be described in greater detail in connection with FIGS. 3a to 3c.

FIGS. 2a to 2c illustrate three alternative configurations for a thermal fuse in a capacitor according to the invention. The thermal fuses also operate as overload fuses, and in some cases even as pressure fuses.

FIG. 2a shows a solution where the lead 7 is connected to the rigid uninsulated conductor 8 made of copper by means of a single unbroken fusible portion 9, which acts as an overload fuse and which preferably consists of a fuse wire. Depending on the manufacturer, the cross-section of the fuse wire may be round, flat or of some other kind. The fusible portion 9 is secured to the lead 7 by means of a joint 10, e.g. by soldering or some other means suitable for providing good conductivity. The joint 11 between the fusible portion 9 and the conductor 8 is formed of a soldering paste having a melting point of, for example, 100° to 160° C., preferably about 140° C., when the insulating material used is polypropylene. As the melting point of polypropylene is about 165° to 170° C., the soldering paste melts when the temperature becomes high enough, and the joint between the fusible portion 9 and the conductor 8 is broken. If desired, the first joint 10 can also be made of a soldering paste of this kind.

FIG. 2b illustrates another embodiment of the invention. In this case, there is an overload fuse consisting of two fusible portions 9a and 9b between the lead 7 and the conductor 8. The fusible portions 9a and 9b, which are preferably made of a fuse wire, are secured to the lead 7 and correspondingly to the conductor 8 by normal solder joints or the like, and their ends are joined together by a joint 15 formed, as described above, of a soldering paste with a melting point of about 140° C. The structures of both FIG. 2a and 2b operate in principle in an identical manner: a high current peak causes the fusible portion 9, or 9a and 9b, to melt rapidly, and correspondingly a slower rise in the temperature breaks the joint between the conductor 8 and the lead 7.

FIG. 2c shows a simple solution where a thermal fuse is formed directly between the second lead 7 and the conductor 8 by means of a joint 16. In this case, a solder or a soldering paste is disposed between the lead 7 and the conductor 8 in order for an electrical connection to be provided. When the joint 16 is being formed, the conductor and the lead are disposed at a short distance from each other so that they are not in direct contact, whereby the solder or soldering paste which acts as a thermal fuse forms a thin but sufficient layer 17 between them as shown in FIG. 2c.

FIGS. 3a to 3c illustrate how the solution according to the invention operates in case of a fault in the capacitor.

FIG. 3a shows how the temperature has begun to rise at point A in the middle of the capacitor 2 as a result of a breakdown, and the polypropylene has gradually started to melt as the breakdown continues. When the melting has spread as far as the core tube 3 in accordance with FIG. 3b, the molten mass starts to heat the core tube 3, the melting point of which is lower than the temperature of the insulating plastic. At the same time pressure has been formed inside the capacitor. When the core tube 3 melts, the pressure causes the polypropylene to enter the core tube as shown at point B, and the molten polypropylene melts almost immediately the soldering paste designed to be used as a thermal fuse and penetrates further between the fusible portions 9a and 9b, consisting of fuse wires, isolating them from each other. After the insulating plastic has penetrated into the core tube of the capacitor as shown in FIG. 3c and cut the current, the breakdown ceases and the capacitor cools down. As a result of this, the damaged capacitor is isolated from the network and is thus naturally inoperative. This isolation has prevented the capacitor from catching fire, and the capacitor unit, comprising several capacitors, can otherwise operate as normal. Thus, if one capacitor becomes damaged, it does not lead to an interruption in the operation or involve any other danger.

The fuse structure of the capacitor according to the invention also operates as a pressure fuse if the second lead 7, extending into the core tube, is mounted in the core tube in such a manner that it can be fairly easily detached without being obstructed by the resin on the upper surface of the capacitor. In this case, if pressure is formed inside the capacitor, it may be discharged in the core tube and cause the core lead to be released from the core tube. At this stage, one of the joints or the fusible portion 9 breaks, and thus the connection between the lead 7 and the conductor 8 is broken.

The capacitor according to the invention can be implemented in various ways; in the specification and the drawings it has been described merely by way of example. Instead of a rigid conductor 8, it is naturally possible to use a resilient one, but a rigid conductor is advantageous in view of the use and manufacture. Between the conductor 8 and the lead 7, there may be one or more joints formed by means of a soldering paste or some other suitable material having a melting point lower than that of the insulating plastic. As stated above, a joint which melts under the effect of heat can be provided in wires operating as an overload fuse either to secure the ends of the fuse wires to leads or to join the ends of the fuse wires together, or for both of these purposes. If desired, the joint can also be made without fuse wires, but the structure described herein is to be preferred in view of safety. The inside of the core tube in the capacitor can be air-filled or it may be filled with a suitable gas or, if desired, with a suitable liquid.

I claim:

1. A capacitor provided with internal protection and made of a metallized plastic film, said capacitor comprising at least two metallized plastic films wound around a core tube to form a capacitor cylinder, a first and a second metallized contact surface formed at the ends of the capacitor cylinder, a first lead connected to said first contact surface, and a second lead extending through the core tube of the capacitor cylinder and connected to the second contact surface of the capacitor cylinder, the second lead being connected to the second contact surface by a separate conductor, and a thermal fuse between the second lead and the conductor, wherein said thermal fuse includes a joint means for forming an electrical connection between the second lead and the separate conductor and a fusible portion formed of a connecting material the melting point of which is lower than that of the plastic film of the capacitor cylinder.

2. A capacitor according to claim 1 wherein said joint means comprises a first and a second joint, each having a first and second end, the first joint being connected at its first end to the lead, the second joint being connected at its first end to the conductor, and the second ends of the first and second joints being connected by said fusible portion.

3. A capacitor according to claim 2, wherein the fusible portion is formed of a separate fuse wire.

4. A capacitor according to claim 1 wherein the joint means is formed of said connecting material which directly connects the lead and the conductor.

5. A capacitor provided with internal protection and made of a metallized plastic film, said capacitor comprising at least two metallized plastic films wound around a core tube to form a capacitor cylinder, a first and a second metallized contact surfaces formed at the ends of the capacitor cylinder, a first lead connected to said first contact surface, and a second lead extending through the core tube of the capacitor cylinder and connected to the second contact surface of the capacitor cylinder, the second lead being connected to the second contact surface by a separate conductor, and a thermal fuse between the lead and the conductor, the thermal fuse including two separate fusible portions disposed between the second lead and the conductor, each being attached at one end, respectively, to the lead and to the conductor by a joint, and the fusible portions being joined together at another end by a joint providing an electrical connection.

6. A capacitor according to claim 5, wherein the conductor is an uninsulated rigid conductor.

7. A capacitor provided with internal protection and made of a metallized plastic film, said capacitor comprising at least two metallized plastic films wound around a core tube to form a capacitor cylinder, a first and a second metallized contact surface formed at the ends of the capacitor cylinder, a first lead connected to said first contact surface, and a second lead extending through the core tube of the capacitor cylinder and connected with the second contact surface of the capacitor cylinder, the second lead being connected to the second contact surface by a separate conductor, and a thermal fuse between the lead and the conductor, wherein the core tube is made of a material having a melting point lower than that of the plastic film of the capacitor cylinder.

8. A capacitor provided with internal protection and made of a metallized plastic film, said capacitor comprising at least two metallized plastic films wound around a core tube to form a capacitor cylinder, a first and a second metallized contact surface formed at the ends of the capacitor cylinder, a first lead connected to said first contact surface, and a second lead extending through the core tube of the capacitor cylinder and connected to the second contact surface of the capacitor cylinder, the second lead being connected to the second contact surface by a separate conductor, and a thermal fuse between the lead and the conductor, wherein the capacitor further includes a case, an insulating material, and gaskets, the capacitor cylinder is positioned within the case, the insulating material is disposed around the capacitor cylinder between said capacitor cylinder and the case, and the ends of the core tube are sealed with the gaskets so that the inside of the core tube may be filled with air a fluid.

* * * * *